(12) United States Patent
Wong et al.

(10) Patent No.: US 7,642,307 B2
(45) Date of Patent: *Jan. 5, 2010

(54) LOW-COLOR STIFF PVB LAMINATES

(75) Inventors: Bert C. Wong, Hockessin, DE (US); Donald L. Rymer, Little Hocking, OH (US); Nolan K. Read, III, Vienna, WV (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 630 days.

This patent is subject to a terminal disclaimer.

(21) Appl. No.: 11/343,591

(22) Filed: Jan. 30, 2006

(65) Prior Publication Data

US 2006/0183833 A1 Aug. 17, 2006

Related U.S. Application Data

(63) Continuation-in-part of application No. 10/501,491, filed as application No. PCT/US03/07352 on Mar. 11, 2003, now abandoned.

(60) Provisional application No. 60/363,936, filed on Mar. 12, 2002.

(51) Int. Cl.
C08F 236/12 (2006.01)
C08K 5/00 (2006.01)
C08L 29/04 (2006.01)
B01J 13/00 (2006.01)
C08F 2/24 (2006.01)
B32B 27/32 (2006.01)
B32B 27/42 (2006.01)

(52) U.S. Cl. .......... 524/297; 524/308; 524/503; 524/557; 524/747; 428/220; 428/437

(58) Field of Classification Search ......... 524/297, 524/308, 503, 557, 747; 428/220, 437
See application file for complete search history.

(56) References Cited

U.S. PATENT DOCUMENTS

| | | | |
|---|---|---|---|
| 3,153,009 A | | 10/1964 | Rombach |
| 4,035,549 A | | 7/1977 | Kennar |
| 4,696,971 A | | 9/1987 | Degeilh |
| 4,937,147 A | | 6/1990 | Cartier et al. |
| 5,013,779 A | | 5/1991 | Fariss et al. |
| 5,187,217 A | * | 2/1993 | Degeilh et al. ......... 524/297 |
| 5,322,875 A | | 6/1994 | Dages |
| 5,573,842 A | * | 11/1996 | Gutweiler ............. 428/220 |
| 5,766,755 A | | 6/1998 | Chaussade et al. |
| 5,886,075 A | | 3/1999 | Keane et al. |
| 6,383,647 B1 | | 5/2002 | Shohi et al. |
| 6,586,103 B2 | | 7/2003 | Shohi et al. |
| 6,673,456 B1 | | 1/2004 | Kobata et al. |
| 2002/0136906 A1 | | 9/2002 | Schohi et al. |
| 2002/0182422 A1 | * | 12/2002 | Garrett et al. ......... 428/437 |
| 2005/0019536 A1 | | 1/2005 | Rymer et al. |
| 2005/0131133 A1 | | 6/2005 | Wong et al. |
| 2005/0192398 A1 | | 9/2005 | Wong et al. |

FOREIGN PATENT DOCUMENTS

| | | |
|---|---|---|
| EP | 0102502 A1 | 3/1984 |
| EP | 0185796 A1 | 7/1986 |
| EP | 1 036 775 A1 | 9/2000 |
| EP | 1036775 A1 * | 9/2000 |
| FR | 2 401 941 | 3/1979 |
| FR | 2401941 * | 3/1979 |
| GB | 2 007 677 A | 5/1979 |
| JP | 64-000104 | 1/1989 |
| JP | 07-149988 | 6/1995 |
| JP | 2005-519791 | 7/2005 |
| JP | 10-139500 | 5/2008 |
| WO | WO 99/61243 | 12/1999 |
| WO | WO 03/078160 A1 | 9/2003 |
| WO | WO 03/078521 A1 | 9/2003 |

OTHER PUBLICATIONS

Online product catalog from Great Lakes Chemical Corporation (WWW.pa.greatlakes.com), 3rd Edition, Oct. 2001.*
PCT International Preliminary Examination Report for International applicationNo. PCT/US03/07354, dated Aug. 16, 2004.
PCT International Search Report for International applicationNo. PCT/US03/07354, dated Apr. 20, 2004.
U.S. Appl. No. 11/343,591, filed Jan. 30, 2006.

(Continued)

Primary Examiner—William K Cheung
(74) Attorney, Agent, or Firm—Kevin Dobson; Mark D. Kuller

(57) ABSTRACT

The present invention describes laminate articles comprising a stiff, low-color PVB sheet having a YID of less than 12 and having a low concentration of plasticizer in the PVB composition, wherein the sheet is prepared from a composition that includes a PVB bleaching compound. A sheet of the present invention is useful for making glass laminates useful for parts in making cars, boats, trains, buildings, display cases, and other articles that utilize transparent glass laminates.

24 Claims, No Drawings

OTHER PUBLICATIONS

Abstract for EP 0 102 502.
PCT Written Opinion for International application No. PCT/US03/07352 dated Nov. 13, 2003.
PCT International Search Report for International application No. PCT/US03/07352 dated Jul. 17, 2003.
On line Product Catalog, Great Lakes Chemical Co. 3$^{rd}$ Edition, 2001, www.pa.greatlakes.com.
Abstract for FR 2 401 941.
English Abstract of JP 64-000104.
English Abstract of JP 07-149988.
English Abstract of JP 10-139500.
English Transatlation of Official Notice of Rejection Mailed on Jun. 10, 2008 for counterpart Japanese Patent Application No. 2003-576517.

* cited by examiner

LOW-COLOR STIFF PVB LAMINATES

This application is a continuation-in-part of U.S. application Ser. No. 10/501,491, filed Jul. 13, 2004, which is a national stage entry of PCT/US03/07352, filed Mar. 11, 2003, which claims priority from U.S. Provisional Application No. 60/363,936, filed Mar. 12, 2002, expired.

BACKGROUND OF THE INVENTION

Plasticized polyvinyl butyral (PVB) sheet is used in the manufacture of laminate structures such as, for example: windshields for vehicles including automobiles, motorcycles, boats and airplanes; homes and buildings; shelving in cabinets and display cases; and other articles where structural strength is desirable in a glass sheet. In many applications, it is desirable that the laminate be transparent and colorless, or at least have very low color. Undesired or unintended color in a glass laminate can be a result of impurities from various sources. In some cases, color can occur in the PVB interlayer. Color in a PVB sheet can result from several sources in the PVB resin, or from the manufacturing process. For example, color can result from instability of the PVB resin, from impurities, or from other additives present in the PVB composition. Color in a PVB sheet can develop during storage of the PVB, or be caused by process conditions to which the resin is subjected.

In a conventional PVB sheet manufacturing process, additives can be included to protect PVB from developing color. Examples of such additives are antioxidants, such as octylphenol, and ultra violet light stabilizers. In some commercial applications, it has been found that combinations of additives can be required for satisfactory results. For example, conventional PVB sheet compositions can include, Tinuvin® P, Tinuvin® 123 in addition to Tinuvin® 326 to obtain satisfactory light stability in the sheet. Using combinations of additives can add additional expense and complexity to the manufacturing process, particularly if a change in the additives must be made. For example, in some instances changing the composition used in a chemical or polymer manufacturing process can have unexpected results. The unexpected results can sometimes be unwanted.

Conventional PVB sheet typically includes a plasticizer in order to increase the flexibility and processibility of the PVB sheet. Generally, the higher the concentration of plasticizer, the more flexible the sheet. Various plasticizers are conventional in the manufacture of PVB, and include such plasticizers as: diesters of polyethylene glycols such as triethylene glycol di(2-ethylhexanoate) (3GO) and tetraethylene glycol diheptanoate (4G7), for example. Typically, plasticizer is included in amounts of greater than 30 pph, based on the total dry weight of the resin. Depending upon the application, as well as other factors, highly plasticized PVB can have as much as 60 pph of plasticizer.

In some special applications, however, it can be desirable to include small amounts of plasticizer so that a stiff PVB sheet can be obtained. One problem with using low plasticizer concentrations is that the PVB composition may require exposure to higher temperatures in order to extrude the resin and/or to shape the extruded sheet for use in the application for which it was intended. However, when a conventional PVB resin is exposed to such high temperature, color can develop in the sheet thereby making it unusable in applications where clarity and high laminate transparency are critical.

It can be desirable in the art of manufacturing PVB laminate articles, to prepare a stiff PVB sheet, wherein the sheet includes a low concentration of plasticizer, by a process wherein the PVB composition does not develop a high color level upon exposure to high temperatures during extrusion or lamination.

It can also be desirable to obtain PVB sheet by a process wherein the color of the sheet can be improved by proper selection of additives used in the process.

SUMMARY OF THE INVENTION

In one aspect, the present invention is a plasticized PVB composition consisting essentially of: polyvinylbutyral having a hydroxyl number of from about 15 to about 25; a plasticizer or mixture of plasticizers present in a finite amount of less than about 30 pph based on the dry weight of the resin composition; a surfactant; and optionally including either (i) a PVB bleaching compound, or (ii) an antioxidant and a UV light stabilizer, or (iii) both (i) and (ii).

In another aspect, the present invention is an article comprising: a plasticized PVB sheet interlayer wherein the PVB sheet consists essentially of: polyvinylbutyral having a hydroxyl number of from about 15 to about 25; a plasticizer or mixture of plasticizers present in a finite amount of less than about 30 pph based on the dry weight of the resin composition; a surfactant; and optionally including either (i) a PVB bleaching compound, or (ii) an antioxidant and a UV light stabilizer, or (iii) both (i) and (ii), wherein the interlayer was obtained after extrusion at a temperature in the range of from about 225° C. to about 245° C., and wherein the interlayer has a yellowness index (YID) measurement of less than about 12.

In still another aspect, the present invention is a laminate article useful as architectural glass and/or as automobile glass, train glass, or boat glass comprising: a plasticized PVB sheet consisting essentially of less than 30 pph of either 3GO or dibutyl sebacate as plasticizer, wherein the PVB sheet has a glass transition temperature ($T_g$) of from at least about 35° C. to 60° C. and a YID of less than about 12.

In still another aspect, the present invention is a process for preparing a low color, PVB sheet comprising the steps: (I) admixing polyvinyl alcohol, butyraldehyde, an acid or mixture of acids, water, and a surfactant (II) stabilizing the mixture obtained in step (I) by (a) raising the pH of the mixture to at least pH 10 (b) isolating the resin by draining the liquid, (c) washing the resin with neutral pH water; (III) plasticizing the PVB resin composition with plasticizer in a finite amount of less than about 30 pph based on the dry weight of the PVB resin; (IV) optionally mixing (a) a PVB bleaching compound and/or (b) an antioxidant and a UV light stabilizer with the PVB resin composition; and (V) extruding the PVB sheet at a temperature of from about 225° C. to about 245° C. to obtain a PVB sheet having a $T_g$ of from at least about 35° C. to 60° C. and a YID of less than about 12.

DETAILED DESCRIPTION

In one embodiment, the present invention is a plasticized PVB sheet composition that includes polyvinylbutyral having a hydroxyl number of from about 15 to about 25, plasticizer in an amount of less than 30 pph based on the dry weight of the PVB resin, and a PVB bleaching compound.

PVB can be manufactured according to known processes. For example, U.S. Pat. No. 3,153,009 describes a process for commercial manufacture of PVB. U.S. Pat. No. 4,696,971 also describes a process for manufacturing PVB wherein sodium dioctylsulfosuccinate (DOSS) is used as a surfactant. With some exceptions that will be obvious to one skilled in the art, the teachings of the above-referenced patents are hereby incorporated by reference.

The PVB composition of the present invention includes the plasticizer in a finite amount, but at a concentration of less than 30 pph, based on the dry weight of the PVB resin. The present invention preferably includes plasticizer in an amount of from about 5 to about 30 pph, more preferably the plasticizer content is from about 15 to about 30 pph. Even more preferably the plasticizer content is from about 18 to about 28 pph, and most preferably from about 18 to about 22 pph.

The term flake, as used in the present invention, describes a particular physical form of PVB resin material, that is, granular or particulate versus a film or a sheet. The physical form of the resin does not necessarily indicate a different PVB composition within the present application, even though sheets and/or films may include additives not found in the resin flake.

Plasticizers of the present invention can be chosen from any that are known or used conventionally in the manufacture of plasticized PVB sheeting compositions. For example, a plasticizer suitable for use herein can be a plasticizer or a mixture of plasticizers selected from the group consisting of: diesters obtained from the chemical reaction of aliphatic diols with carboxylic acids, including diesters of polyether diols or polyether polyols; and, esters obtained from polyvalent carboxylic acids and aliphatic alcohols. For convenience, when describing the sheet compositions of the present invention, a mixture of plasticizers can be referred to herein as "plasticizer". That is, the singular form of the word "plasticizer" as used herein can represent the use of either one plasticizer or the use of a mixture of two or more plasticizers in a given sheet composition. The intended use will be apparent to a reader skilled in the art. Preferred plasticizers for use herein are diesters obtained by the reaction of triethylene glycol or tetraethylene glycol with aliphatic carboxylic acids having from 6 to 10 carbon atoms; and diesters obtained from the reaction of sebacic acid with aliphatic alcohols having from 1 to 18 carbon atoms. More preferably the plasticizer is either 4G7, 3GO or dibutyl sebacate (DBS). Most preferably the plasticizer is 3GO.

The composition of the present invention optionally includes at least one PVB bleaching compound. A PVB bleaching compound (bleaching compound) of the present invention is any compound that can reduce or eliminate color from a PVB sheet relative to the color of an otherwise identical composition, treated using an identical or similar process, with the exception that a bleaching compound is not present. The mode of the bleaching action demonstrated by the bleaching compound is not critical to the present invention. For example, a bleaching compound useful in the practice of the present invention can be a compound that reacts directly with color-forming compounds (color bodies) present in a PVB sheet composition, or a compound that is capable of yielding a compound that reacts directly with color-bodies. A bleaching compound can be a compound that can decompose in situ to yield decomposition products capable of reacting with color bodies present in a PVB sheet composition. A bleaching compound in the practice of the present invention can be a compound that inhibits the formation of color bodies. Bleaching compounds of the present invention include, for example, inorganic bisulfites such as sodium or potassium bisulfite; organic bisulfites such as tetramethylammonium bisulfite; and compounds similar in structure or function. Bleaching compounds also include sulfosuccinates such as dialkyl sulfosuccinates. For example, the present invention can include DOSS as a bleaching compound.

A bleaching compound of the present invention can be included in any effective finite amount. An effective amount for the purposes of the present invention is any amount that reduces the color of a PVB sheet relative to the color of an identical or substantially similar PVB sheet composition without the bleaching compound. Color measurement can be done according to any conventional standard practice. Alternatively, in the absence of comparative data, an effective amount is any amount that reduces the color of a PVB sheet to a yellowness index (YID) of less than about 12 YID. Preferably the YID is less than about 10, more preferably less than about 8, and most preferably less than about 6.

A bleaching compound can be included in an amount of from about 0.01 to about 0.85 pph, based on the weight of polyvinyl alcohol (PVA) used in the preparation of PVB. Preferably, the bleaching compound is present in an amount of from about 0.05 to about 0.80 pph, more preferably in an amount of from about 0.10 to about 0.75 pph, and most preferably in an amount of from about 0.15 to about 0.70 pph. While color reduction in a PVB sheet is an important consideration, the amount of bleaching compound included will also be a function of the cost of production and the other properties that may be affected by including the additive.

The present invention includes a surfactant. A surfactant suitable for use herein can be any that is known to be useful in the art of polyvinylbutyral manufacture. For example, surfactants suitable for use herein include: sodium lauryl sulfate; ammonium lauryl sulfate; sodium dioctyl sulfosuccinate; ammonium perfluorocarboxylates having from 6 to 12 carbon atoms; sodium aryl sulfonates, adducts of chlorinated cyclopentadiene and maleic anhydride; partially neutralized polymethacrylic acid; alkylaryl sulfonates; sodium N-oleyl-N-methyl taurate; sodium alkylaryl polyether sulfonates; triethanolamine lauryl sulfate; diethyl dicyclohexyl ammonium lauryl sulfate; sodium secondary-alkyl sulfates; sulfated fatty acid esters; sulfated aryl alcohols; and the like. Preferable surfactants include sodium lauryl sulfate, sodium dioctyl sulfocuccinate, sodium cocomethyl tauride, and decyl (sulfophenoxy)bezenesulfonic acid disodium salt.

The surfactant can be included in any effective amount for the particular set of process conditions practiced. The surfactant can be included in an amount of from about 0.01 to about 0.85 pph by weight, based on the weight of PVA used to prepare PVB. Preferably the surfactant is included in an amount of from about 0.10 to about 0.80 pph. More preferably, the surfactant is included in an amount of from about 0.15 to about 0.75 pph. Most preferably, the surfactant is included in an amount of from about 0.15 to about 0.70 pph.

The surfactant and the bleaching compound can be the same compound, or can perform both functions. The bleaching compound is optional only in the event that the surfactant can also perform the function of a bleaching compound. Otherwise the bleaching compound is considered to be essential in the practice of the present invention. For example, DOSS can be used in the practice of the present invention as a surfactant. DOSS can also be a bleaching compound in the practice of the present invention. In one particularly preferred embodiment, DOSS can be included as both a surfactant and as a bleaching compound. In this embodiment, the use of a bleaching compound other than DOSS is optional.

Antioxidants can be optionally included in a PVB composition of the present invention during sheet preparation to inhibit the oxidation of the PVB sheet and/or components. Preferred antioxidants are known conventionally and available commercially. Most preferred are bis-phenolic antioxidants, which are surprisingly more suitable for preparing low color PVB sheeting, particularly when 3GO is used as plasticizer. Bis-phenolic antioxidants are available and can be obtained commercially. Suitable bis-phenolic antioxidants include 2,2'-ethylidenebis(4,6-di-t-butylphenol); 4,4'-butylidenebis(2-t-butyl-5-methylphenol); 2,2'-isobutylidenebis(4,6-dimethylphenol); and 2,2'-methylenebis(6-t-butyl-4-methylphenol), for example. Bis-phenolic anti-oxidants are commercially available under the tradename of ANOX™ 29, LOWINOX® 22M46, LOWINOX® 44B25, and LOWINOX® 221B46, for example.

An antioxidant can be included in any effective finite amount. Preferably, the antioxidant is included in an amount of from about 0.01 to about 0.6%, based on the total weight of the sheet. More preferably, the antioxidant is present in amount of from about 0.03 to about 0.3%, most preferably in an amount of from about 0.05 to about 0.25%.

Other additives are known conventionally to be useful, and can be included in a sheet composition of the present invention. Such additives include: light stabilizers, particularly UV light stabilizers, such as Tinuvin® P; Tinuvin® 326, and Tinuvin® 123. UV light stabilizers can stabilize the PVB composition by absorbing ultraviolet light and preventing unwanted effects by the UV light on the PVB. Adhesion control agents such as alkali and alkaline earth metal salts of carboxylic acids, alkaline earth metal salts of inorganic acids, or a combination of such salts can be added. Surface tension controlling agents such as Trans® 290 or Trans® 296 available from Trans-Chemco; or Q2-3183A® available from Dow Chemical can be used in the practice of the present invention. The use of Trans® 290 or Trans® 296 is preferred.

A PVB resin of the present invention can be obtained by processes known in the art of PVB manufacture. PVB resins used in the practice of the present invention can be prepared by mixing PVA with butyraldehyde in an aqueous medium in the presence of an acid or mixture of acids, at a temperature of from 5° C. to 100° C.

Typically, the ratio of PVA to butyraldehyde can be chosen such that the PVB has residual hydroxyl functionality, conventionally reported as OH number. Residual hydroxyl functionality can vary according to what properties are desirable in the PVB. The relative amounts of butyraldehyde and PVA required to obtain the desired OH number in the PVB resin will be readily apparent to those skilled in the art of PVB manufacture. In the practice of the present invention residual hydroxyl can be in the range of from about 14 to about 30. Preferably, the OH number is from about 15 to about 25. More preferably, the OH number is from about 15 to about 20, and most preferred in the practice of the present invention is PVB resin having an OH number in the range of from about 17 to about 19. The OH number can be determined according to standard methods such as ASTM D1396-92.

In a preferred embodiment, a low color PVB sheet of the present invention can be obtained by a process comprising the steps: (I) admixing polyvinyl alcohol, butyraldehyde, an acid or mixture of acids, water, and a surfactant (II) stabilizing the mixture obtained in step (I) by (a) raising the pH of the mixture to at least pH 10 (b) isolating the resin by draining the liquid, (c) washing the resin with neutral pH water; (III) plasticizing the PVB resin composition with from about 10 to about 30 pph of plasticizer based on the dry weight of the PVB resin; (IV) optionally mixing (a) a PVB bleaching compound and/or (b) an antioxidant and a UV light stabilizer with the PVB resin composition; and (V) extruding the PVB sheet composition at a temperature of from about 225° C. to about 245° C. to obtain a PVB sheet having a $T_g$ in the range of from about 35° C. to about 60° C., and a YID of less than about 12.

The steps of the process described herein can be carried out in varied order. For example, while it can be necessary to carry out step (I) before step (II) it is not essential, for the purpose of obtaining a low color sheet of the present invention, that steps (III) or (IV) be carried out in any particular order. Although it may be preferable to implement these steps just prior to, or simultaneous with, step (V). Also, the order of addition of components is not critical in the practice of the present invention, although a skilled artisan will recognize that there may be other benefits of carrying out the process in a consistent and ordered manner. For example, plasticizer can be mixed with the PVB either before or during the extrusion of the PVB composition, as described in U.S. Pat. No. 5,886,075.

Plasticizer can be added in any amount desirable to obtain a plasticized PVB composition. To obtain a stiff PVB sheet in one embodiment of the present invention, plasticizer is added in an amount of less than about 30 pph, based upon the total dry weight of the resin. The "dry weight" as used herein refers to the weight of the resin after water has been removed from the resin.

The glass transition temperature (Tg) of a PVB sheet is dependent in part upon the concentration of plasticizer included in the composition. A PVB sheet useful in the practice of the present invention has a Tg of from about 35° C. to about 60° C., as measured by Dynamic Mechanical Analysis ASTM D4065 (DMA), using the tangent delta (phase shift at 1 Hz) data as indicator. Preferably, the Tg is from about 40° C. to about 57° C., more preferably from about 45° C. to about 57° C., most preferably from about 50° C. to about 55° C.

In one of the preferred embodiments of the present invention, a stiff PVB sheet can be obtained having low color and low concentration of plasticizer. For sheet having low concentration of plasticizer, it can be necessary to extrude the sheet at a higher temperature than when using higher amounts of plasticizer. For example, PVB resin plasticized with from about 5 to about 30 pph plasticizer can be extruded at a temperature of from about 225° C. to about 245° C. Preferably the resin can be extruded at a temperature of from about 227° C. to about 245° C. More preferably, the resin can be extruded at a temperature of from about 228° C. to about 242° C., and most preferably from about 230° C. to about 240° C.

A low color PVB sheet suitable for the purposes herein can be obtained by a process that comprises the steps of: (1) isolating PVB flake from a PVA/butyraldehyde reaction mixture previously described herein; (2) optionally admixing an antioxidant and a UV light stabilizer with the plasticizer to obtain a plasticizer/additive mixture (plasticizer mixture); and (3) co-extruding the flake, plasticizer, antioxidant, and UV light stabilizer, or alternatively co-extruding the flake and the plasticizer mixture at a feed ratio of plasticizer mixture to dry of flake from about 5:100 (wt:wt) to about 30:100 (wt:wt) at a temperature of from about 225° C. to about 245° C. to obtain a low-color PVB sheet having a YID of less than about 12. It is preferable to admix the antioxidant/UV light stabilizer with the plasticizer prior to extrusion of the sheet.

In still another embodiment, a laminate article can be obtained from a PVB sheet of the present invention. Procedures for preparing glass/PVB laminates are well known in the art, and a skilled artisan would be able to construct a laminate from the presently claimed PVB sheet. A glass/PVB laminate article as claimed in the present invention can be obtained, for example, by bringing the surfaces of the PVB and glass into contact, pressing the surfaces together at ambient temperature, and then removing air from the laminate structure in an autoclave. The surface of the PVB can be roughened to facilitate removal of air from the laminate. Other procedures are known and used conventionally. While PVB/glass laminates are described herein, PVB can be used as interlayer material for laminating to other plastic materials such as polyesters or ionomeric sheeting, for example.

For example, a laminate of the present invention can be obtained by a process comprising the steps of: putting together at least one layer of curved specialty glass with at least one layer of PVB of the present invention to make a glass/PVB assembly; placing the assembly into a bag capable of sustaining a vacuum; drawing air out of the bag using a vacuum line or other means of pulling a vacuum on the bag; sealing the bag while maintaining the vacuum; placing the sealed bag in an autoclave at a temperature of from about 130° C. to about 180°, at a pressure of from about 200 psi (15 Bars), for from about 10 to about 50 minutes. Preferably the bag is autoclaved at a temperature of from about 140° C. to about 160° C. for 20 minutes to about 45 minutes, more preferably at a temperature of from about 145 to about 160° C. for about 20 to 40 minutes, and most preferably at about 145° C. to about 155° C. for about 25 to about 35 minutes.

Laminates of the present invention can be useful in various applications for protection from the environment in architectural applications, and/or in vehicles such as automobiles, boats and trains. Architectural uses for stiff PVB laminates of the present invention include, but are not limited to: external uses such as external windows on buildings, external doors, partitions; internal uses such as office windows, office doors, glass partitions, table tops, shelves, cabinet doors, protective covers for tables, room dividers, picture frame glass, display cabinets, display cases, and the like. In vehicles, uses for laminates of the present invention include, but are not limited to: windshields; light covers; body glass, such as sun roof, moon roof, and/or side windows; internal doors; partitions; cabinet doors, and the like. Transparency and clarity are important considerations in applications such as these. Just as important is the protection afforded by the interlayer against splintering and expulsion of glass particles in the event of accidental or intentional impact against the glass laminate.

Laminates of the present invention can be useful as specialty glass laminates, such as on aircraft. Toughness, transparency and clarity are important considerations in applications such as these. Just as important is the protection afforded by the interlayer against splintering and expulsion of glass particles in the event of accidental or intentional impact against the glass laminate.

Glass suitable for use in aircraft glazing laminates can have functionality embedded in the glass or on the surface of the glass. For example the glass can have various antennae or sensors embedded in the glass or on the surface of the glass. Such specialty glass is known or can be obtained commercially. In any event, the presence or absence of said functionality does not add to nor detract from the novelty of the presently claimed invention.

Laminate glass used in aircraft can have various sizes and shapes. Laminates can be rectangular, square or have rounded edges to give an oval or circular appearance. While laminates can be made in any size, aircraft laminate glass typically is small compared with automobile glass or architectural glass laminates. Typically, aircraft laminate glass can have an area of less than about 1 square meter (1 m²). More typically, aircraft laminate glass has an area of less than about 0.4 m².

Glass suitable for use herein can have a high curvature. Lamination of a PVB sheet of the present invention to glass having high curvature can require lamination conditions described herein. The curved glass can have a curvature of from about 0.1 miliradian to about 3.2 radians with a radius of curvature of from about 20 cm to about 350 cm.

Laminates of the present invention can include an additive to block the transmission of UV light through the laminate. The additive is preferably the same additive as the UV light stabilizer. The laminate preferably absorbs UV light so that less than 10% of UV light is transmitted through the laminate. Preferably less than 8% of the UV light is transmitted through the laminate, more preferably less than 6% UV light is transmitted, and most preferably less than 3%.

PVB interlayers of the present invention can have a thickness of greater than 0.254 mm. Preferably, PVB interlayers of the present invention have a thickness in the range of form about 0.254 mm to about 1.6 mm. Multiple layers of PVB can be laminated together or in alternate layers of a laminate. Such multilayer laminates can have PVB interlayers that have a total thickness of greater than 1 mm. Where it is desirable to obtain a laminate wherein the total interlayer thickness is at least 1 mm thick, the YID of the interlayer should not be greater than 12, because the transparency of the laminate can be substantially reduced.

In the present application, the term flake can be used to describe a particular physical form of PVB resin material, that is, granular or particulate versus a film or a sheet. The physical form of the resin does not necessarily indicate a different PVB composition within the present application, even though sheets and/or films may include additives not found in the resin flake.

EXAMPLES

The following Examples and comparative examples are presented to further illustrate the present invention. The Examples are not intended to limit the scope of the invention in any manner, nor should they be used to define the claims or specification in any manner that is inconsistent with the invention as claimed and/or as described herein.

Analytical tests for Hydroxyl number and YID were performed for each of the examples and comparative examples according to the methods below.

Hydroxyl number: ASTM D 1396-92.

Sheet Yellowness Index (YID)

A PVB chip is made with 21.0 grams of sheet, and heat pressed into a 10.0 mm thick disk of 50.8 mm diameter. Chip preparation involves preheating a stack of 50.8 mm disks cut from the sheet in a mold for one minute at 2200 N force and 185° C., then increasing the pressing force to 32,000 N at 185° C. for two minutes, and cooling under the same force for 7.5 minutes. No residual surface pattern that was on the extruded sheet is visible in the chip. Yellowness index was determined per ASTM D1925-70 on the 10.0 mm thick chip.

Glass Transition Temperature—$T_g$ is determined by DMA using the procedure of ASTM.D4065, using the tangent delta at 1 Hz.

Example 1

Poly(vinyl butyral) sheet was prepared as follows: at 90° C., a mixture comprising 32 parts by weight of poly(vinyl alcohol) of average degree of polymerization 618 and 99.5% hydrolyzed and 68 parts by weight of PVA of average degree of polymerization 1005 and 99.5% hydrolyzed was dissolved in 615 parts by weight of demineralized water. To this solution was added 1 part by weight of 88% para-toluene sulfonic acid and enough sulfuric acid to bring the dissolved PVA solution to a pH of 2. Using the procedure described in U.S. Pat. No. 3,153,009, 62 parts by weight of n-butyraldehyde and 0.47 parts by weight of 70% DOSS and the PVA solution were charged into a vessel maintained at 90° C. After a one hour hold time, a slurry was obtained and the slurry was stabilized with a sodium hydroxide solution to raise the pH to 11. Concurrent with the stabilization, 0.07 parts by weight Trans® 290 surface tension stabilizing agent was added. The slurry was then washed and cooled with demineralized water. A granular, white PVB resin with residual hydroxyl number of 18.6 was obtained. The flake was mixed with 3GO plasticizer containing 4 grams per liter of Tinuvin® P and 8 grams per liter of Lowinox® 44B25 antioxidant and was extruded so that the residence time in the extrusion system was about 15 to 25 minutes. The feed rate ratio of plasticizer to dry flake was 35:100 (wt:wt). Potassium formate solution was injected so as to deliver a potassium concentration of 10 parts per million (ppm) in the sheet. Melt temperature measured at the slot die was between 210 and 215° C. Sheet YID was 5.85.

Example 2

PVB sheet was made in the manner as in Example 1, except that the feed ratio of the plasticizer to dry PVB flake was 20:100, and the melt residence time was 25 to 40 minutes. Melt temperature at the die was 233° C. Sheet yellowness index was 5.05.

Example 3

PVB sheeting was made in the same manner as in Example 2, except that the surface pattern due to melt fracture was quenched in a water bath as disclosed in U.S. Pat. No. 5,886,075 by Keene et al. Melt temperature was between 225° C. and 230° C. Sheeting YID was 4.80, and washboard-shape pattern was clearly visible on the surface of the sheeting.

Comparative Example C1

PVB flake was prepared as in Example 1 except that 0.4 parts by weight of sodium lauryl sulfate, based on the weight of PVA, was used in the place of DOSS as the surfactant, and no other surface tension modifiers were added. A granular, white PVB resin with residual hydroxyl number of 18.6 was obtained. Using the flake made with sodium lauryl sulfate as described here, sheet was prepared as in Example 1. Melt temperature measured at the slot die was between 210 and 213° C. Sheet yellowness was 25.05.

Comparative Example C2

The flake described in Example C1 was used to prepare sheet as in Example 1, except that the feed rate ratio of 3GO plasticizer to dry resin of 24:100, and the potassium level in the sheet was 50 ppm, and the melt residence time in the system was 25-40 minutes. Melt temperature at the die was between 228 and 233° C. Sheet yellowness was 53.82.

Example 4

An interlayer of Example 1 is laminated by first conditioning the polyvinyl butyral interlayer of Example 1 at 23° C.±2° C. in an environment of 23±3% relative humidity overnight. The interlayer is then sandwiched between two pieces of glass of dimension 12"×12" (305 mm×305 mm) and 2.5 mm nominal thickness which have been washed and rinsed in demineralized water. The glass/PVB/glass assembly is prepared in a controlled temperature and humidity environment. The assembly is then placed in a plastic or rubber bag, and the bag is evacuated for up to 30 minutes and then sealed. Thereafter, the evacuated bag bearing the assembly is placed in an air autoclave where the temperature is raised to 135° C. and pressure to 200 psig (14.3 bar). These conditions are maintained for 20 minutes, after which the air is cooled while no more air is added to the autoclave. After 20 minutes of cooling when the air temperature in the autoclave is under 50° C., the excess air pressure is vented.

Example 5

An interlayer of Example 2 is laminated according to the procedure of Example 4.

Example 6

An interlayer of Example 3 is laminated according to the procedure of Example 4.

What is claimed is:

1. A process for preparing a low color poly(vinyl butyral) sheet comprising the steps:
   (I) admixing polyvinyl alcohol, butyraldehyde, an acid or mixture of acids, water, and sodium dioctyl sulfosuccinate to form a mixture,
   (II) stabilizing the mixture obtained in step (I) by (a) raising the pH of the mixture to at least pH 10, (b) isolating polyvinyl butyral resin by draining liquid, (c) washing the poly(vinyl butyral) resin with neutral pH water;
   (III) plasticizing the polyvinyl butyral resin with a finite amount of less than 30 pph of plasticizer based on the dry weight of the poly(vinyl butyral) resin;
   (IV) mixing (a) a polyvinyl butyral bleaching compound selected from the group consisting of organic bisulfites, inorganic bisulfites and sulfosuccinates and, optionally, (b) an antioxidant and a UV light stabilizer, with the poly(vinyl butyral) resin; and
   (V) extruding the polyvinyl butyral after completion of steps (III) and (IV) at a temperature of from about 225° C. to about 245° C. to obtain the polyvinyl butyral sheet, the polyvinyl butyral sheet having a $T_g$ in the range of from about 35° C. to about 60° C. and a YID of less than 12.

2. The process of claim 1 wherein the sodium dioctyl sulfosuccinate is included in amount of from about 0.01 to about 0.85 pph by weight, based on the weight of polyvinyl alcohol.

3. The process of claim 1 further comprising laminating the polyvinyl butyral sheet to glass.

4. The process of claim 1 wherein the plasticizer is present in an amount of from about 5 to about 30 pph.

5. The process of claim 2 wherein the plasticizer is present in an amount of from about 15 to about 30 pph.

6. The process of claim 5 wherein the plasticizer is present in an amount of from about 18 to about 22 pph.

7. The process article of claim 3 wherein the laminate comprises at least one layer of the polyvinyl butyral sheet and at least one layer of glass wherein the polyvinyl butyral sheet layer has a thickness in the range of from about 0.254 mm to about 1.6 mm.

8. The process of claim 7 wherein the laminate is useful as: architectural glass; automobile glass; train glass; or boat glass.

9. The process of claim 1 wherein the plasticizer is selected from the group consisting of triethylene glycol di(2-ethylhexanoate), tetraethylene glycol diheptanoate, dibutyl sebacate, and mixtures thereof.

10. The process of claim 2 wherein the sodium dioctyl sulfosuccinate is included in amount of from about 0.01 to about 0.85 pph by weight, based on the weight of polyvinyl alcohol.

11. The process of claim 2 wherein the sodium dioctyl sulfosuccinate is included in amount of from about 0.05 to about 0.80 pph by weight, based on the weight of polyvinyl alcohol.

12. The process of claim 2 wherein the sodium dioctyl sulfosuccinate is included in amount of from about 0.15 to about 0.75 pph by weight, based on the weight of polyvinyl alcohol.

13. The process of claim 2 wherein the sodium dioctyl sulfosuccinate is included in amount of from about 0.15 to about 0.70 pph by weight, based on the weight of polyvinyl alcohol.

14. The process of claim 1 wherein the antioxidant is included in an amount of from about 0.01 to about 0.6%, based on the total weight of the sheet.

15. The process of claim 14 wherein the antioxidant is a bis-phenolic antioxidant.

16. The process of claim 1 wherein the bleaching compound is a dialkyl sulfosuccinate.

17. The process of claim 2 wherein the bleaching compound is sodium dioctyl sulfosuccinate.

18. The process of claim 1 wherein the polyvinyl butyral bleaching compound is selected from the organic bisulfites.

19. The process of claim 1 wherein the polyvinyl butyral bleaching compound is selected from the inorganic bisulfites.

20. The process of claim 1 wherein the polyvinyl butyral bleaching compound is present in an amount of from about 0.01 to about 0.85 parts per hundred, based on the weight of polyvinyl alcohol used in the preparation of the polyvinyl butyral resin.

21. The process of claim 17 wherein the polyvinyl butyral bleaching compound is present in an amount of from about 0.10 to about 0.75 parts per hundred, based on the weight of polyvinyl alcohol used in the preparation of the polyvinyl butyral resin.

22. A process for preparing a low color polyvinyl butyral sheet comprising the steps:
  (I) admixing polyvinyl alcohol, butyraldehyde, an acid or mixture of acids, water, and sodium dioctyl sulfosuccinate at a temperature of 5 to 100° C. to form a mixture;
  (II) stabilizing the mixture obtained in step (I) by (a) raising the pH of the mixture to at least pH 10, (b) isolating polyvinyl butyral resin by draining liquid, and (c) washing the polyvinyl butyral resin with neutral pH water;
  (III) plasticizing the polyvinyl butyral resin with about 5 to about 30 pph of plasticizer, based on the dry weight of the polyvinyl butyral resin, wherein the plasticizer is selected from the group consisting of triethylene glycol di(2-ethylhexanoate), tetraethylene glycol diheptanoate, dibutyl sebacate, and mixtures thereof; and
  (IV) extruding the polyvinyl butyral resin at a temperature of from about 225° C. to about 245° C. to obtain a polyvinyl butyral sheet having a glass transition temperature ($T_g$) in the range of from about 35° C. to about 60° C. and a YID of less than 12.

23. A process for preparing a low color polyvinyl butyral sheet comprising the steps:
  (I) admixing polyvinyl alcohol, butyraldehyde, an acid or mixture of acids, water, and sodium dialkyl sulfosuccinate to form a mixture;
  (II) stabilizing the mixture obtained in step (I) by (a) raising the pH of the mixture to at least pH 10, (b) isolating polyvinyl butyral resin by draining liquid, and (c) washing the polyvinyl butyral resin with neutral pH water;
  (III) plasticizing the polyvinyl butyral resin with about 5 to about 30 pph of plasticizer selected from the group consisting of diesters obtained by (a) the reaction of triethylene glycol or tetraethylene glycol with aliphatic carboxylic acids having from 6 to 10 carbon atoms and (b) the reaction of sebacic acid with aliphatic alcohols having from 1 to 18 carbon atoms, and mixtures thereof, based on the dry weight of the polyvinyl butyral resin; and
  (IV) extruding the polyvinyl butyral resin at a temperature of from about 225° C. to about 245° C. to obtain a polyvinyl butyral sheet.

24. The process of claim 23 wherein the plasticizer is selected from the group consisting of the diesters obtained by the reaction of triethylene glycol or tetraethylene glycol with aliphatic carboxylic acids having from 6 to 10 carbon atoms.

* * * * *

UNITED STATES PATENT AND TRADEMARK OFFICE
CERTIFICATE OF CORRECTION

| | | |
|---|---|---|
| PATENT NO. | : 7,642,307 B2 | Page 1 of 1 |
| APPLICATION NO. | : 11/343591 | |
| DATED | : January 5, 2010 | |
| INVENTOR(S) | : Wong et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 818 days.

Signed and Sealed this

Sixteenth Day of November, 2010

David J. Kappos
*Director of the United States Patent and Trademark Office*